Feb. 3, 1925.
L. DUFEK
1,525,120
HEADLIGHT LENS
Original Filed March 6, 1923
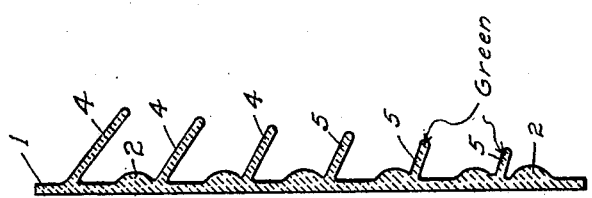
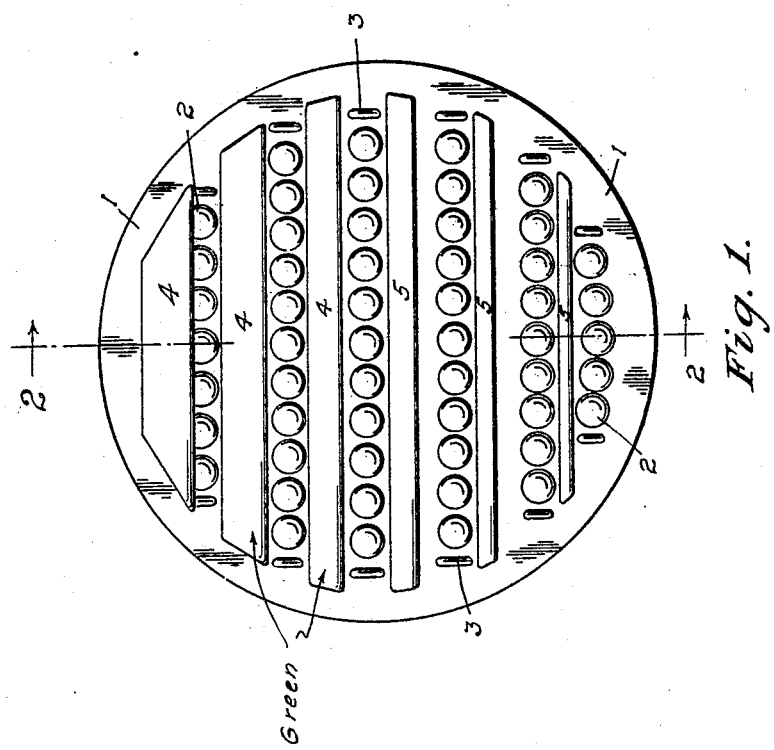
INVENTOR
Louis Dufek
BY
ATTORNEY Patented Feb. 3, 1925.

1,525,120

UNITED STATES PATENT OFFICE.

LOUIS DUFEK, OF SEATTLE, WASHINGTON, ASSIGNOR TO DUFEK LENS COMPANY, OF SEATTLE, WASHINGTON, A CORPORATION OF WASHINGTON.

HEADLIGHT LENS.

Application filed March 6, 1923, Serial No. 623,284. Renewed September 15, 1924.

*To all whom it may concern:*

Be it known that I, LOUIS DUFEK, a citizen of the Czechoslovakia Republic, residing at Seattle, in the county of King and State of Washington, have invented a new and useful Headlight Lens, of which the following is a specification.

My invention has particular reference to improvements in headlight lenses for automobiles, or the like, and is designed to set forth an improved construction on the headlight lens for which Letters Patent of the United States No. 1,372,872 were issued to me on March 29th, 1921.

The objects of my invention are, to provide a lens having a body of uncolored glass and a plurality of transversely extending strips of colored glass, preferably green, so arranged in angular relation to the body as to direct uncolored rays of light toward the path of travel, and to color and dim the ascending rays; to provide a number of raised portions in the body of the lens, and disposed between said strips, adapted to intensify the uncolored rays of light emanating from the headlight, and to direct portions of said rays laterally; and, to provide a lens which presents a light restful to the eyes and free from glare to occupants of approaching vehicles.

In the accompanying drawing—

Figure 1 is a front elevation of said device.

Fig. 2, a vertical sectional view thereof, taken along the line 2—2 of Fig. 1.

Referring more particularly to the drawing, the body 1, of uncolored glass, carries a series of rows of outwardly rounded raised portions 2, each row terminating at either end in a vertically extending ridged projection 3, all integral with the body and of the same material. Said raised portions are designed to intensify the rays of uncolored light to be projected by the lens, while the ridged projections are useful in directing said rays laterally of the headlight.

The strips 4 of colored glass, preferably green and integral with the body, are disposed downwardly and, cooperating with the body of the lens, permit rays of uncolored light to be directed to the roadway, and at the same time diffusing colored rays of light toward the front and upper portions of the automobile. The strips 5 are of the same material, and being somewhat shorter and inclined to a lesser degree than the first series of strips, they permit uncolored rays of light to be projected more immediately forward of the vehicle, and further, to color ascending rays.

In the patent referred to its distinguishing feature resides in a series of transverse ridges extending along the outer portion of the body of the lens, said body and ridges being made of uncolored glass, and the ridges being provided each with a thin layer or lamina of colored glass, preferably green, on its upper surface.

By experimentation I have found that the strips as herein described, made entirely of colored glass, permit uncolored light to be directed to the roadway, with the added advantages that the ascending rays are more colored and dimmed, and the front of the lens is less glaring to the sight. It presents practically a green color to an approaching driver, and still effectually illuminates the roadway with uncolored light. It produces these results in a better way than the device set forth in said patent.

The present device offers less manufacturing problems than the prior one, in that the strips of colored glass can be applied to the body in a more economical and convenient manner than the thin layer of colored glass mentioned, thus reducing its cost and increasing its practicability.

While I prefer to make this lens one of integral structure, it is obvious to those skilled in the art, that separate strips of colored glass, of any suitable color, could be used in connection with an uncolored cover glass of a headlight and the strips disposed in different angular relations with said glass; or, the rounded and ridged projections, or any or all of them, be eliminated, and still keep within the spirit of my invention, hence I ask that I be not limited to the exact details of construction shown.

I claim:

1. A device of the class described, comprising a body of uncolored glass, a plurality of strips of colored glass disposed on the outer surface of the body and in spaced parallel relation, a plurality of outwardly rounded raised portions disposed between said strips, and a vertically extending ridged projection located between said strips and adjacent each end thereof, said portions and projections being integral with the body.

2. A device of the class described, comprising a body of uncolored glass, a series of strips of colored glass disposed on the upper and outer surface of the body and in spaced parallel relation, said strips extending downwardly at an acute angle, a second series of strips of colored glass disposed on the lower and outer surface of the body and in spaced parallel relation, said second series extending downwardly at a lesser angle than said first series, and a row of outwardly rounded raised integral portions on the outer surface of the body and located between said strips, each row terminating at each end in a vertically extending ridged integral projection located adjacent each end of the strips.

LOUIS DUFEK.